(12) United States Patent
Tanabe

(10) Patent No.: US 7,616,839 B2
(45) Date of Patent: Nov. 10, 2009

(54) IMAGE DATA TRANSFER SYSTEM, METHOD OF GENERATING IMAGE DATA FILE, AND COMPUTER PROGRAM

(75) Inventor: Akihiro Tanabe, Minato-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 11/333,123

(22) Filed: Jan. 17, 2006

(65) Prior Publication Data
US 2006/0170779 A1    Aug. 3, 2006

(30) Foreign Application Priority Data
Jan. 31, 2005    (JP) ............... 2005-023249

(51) Int. Cl.
*G06K 9/54* (2006.01)
*H04N 5/225* (2006.01)
*H04N 7/173* (2006.01)

(52) U.S. Cl. ............... 382/305; 348/207.99; 725/105

(58) Field of Classification Search ............... 382/276, 382/305, 307, 312, 232; 348/14.01, 207.1, 348/207.99; 725/105, 118, 145, 153; 455/39, 455/557; 386/46, E5.002
See application file for complete search history.

(56) References Cited

U.S. PATENT DOCUMENTS

| | | | | |
|---|---|---|---|---|
| 6,151,652 | A * | 11/2000 | Kondo et al. ............... | 713/300 |
| 6,930,709 | B1 * | 8/2005 | Creamer et al. ........... | 348/211.3 |
| 6,983,419 | B1 * | 1/2006 | Yonezawa et al. ........... | 715/722 |
| 7,415,287 | B2 * | 8/2008 | Ueno ......................... | 455/557 |
| 2004/0114044 | A1 * | 6/2004 | McCurdy et al. ....... | 348/207.99 |
| 2005/0192982 | A1 * | 9/2005 | Takahashi ................... | 707/100 |

* cited by examiner

*Primary Examiner*—Kanji Patel
(74) *Attorney, Agent, or Firm*—Canon U.S.A., Inc. I.P. Division

(57) ABSTRACT

An imaging apparatus transfers image data obtained during image capturing to a communication apparatus and also transmits image setting information used during image capturing of the image data to the communication apparatus. The communication apparatus records the image data transferred from the imaging apparatus, generates a file from the recorded image data, associates the image setting information transmitted from the imaging apparatus with the file of the image data and store the associated information and file.

12 Claims, 12 Drawing Sheets

FIG.5

| |
|---|
| HUE |
| GAMMA |
| SETUP LEVEL |
| SCAN DETAIL |
| SHARPNESS |
| COLOR MATRIX |
| RED |
| GREEN |
| BLUE |
| KNEE |
| BLACK |
| FILE ID ~501 |
| DATE ~502 |
| TIME CODE ~503 |
| ATN ~504 |

FIG.7

| ID | CUSTOM PRESET FILE NAME | VIDEO FILE NAME | DATE AND TIME |
|---|---|---|---|
| 1 | CustomPreset001.pst | Movie001.avi | 2004.6.03  10:11 |
| 2 | CustomPreset002.pst | Movie002.avi | 2004.6.04  21:32 |
| 3 | | | |

FIG.12
PRIOR ART

| Offset 0 | 1 | 2 | 4 | 6 |
|---|---|---|---|---|
| bmRequestType | bRequest | wValue | wIndex | wLength |
| SET_INTERFACE 0x0B | 0000 0001b | ALTERNATE SETTING #1 | INTERFACE #1 | 0 |

FIG.13
PRIOR ART

Offset

| | | |
|---|---|---|
| 0 | DESCRIPTOR LENGTH | ~1301 |
| 1 | DESCRIPTOR TYPE | ~1302 |
| 2 | DESCRIPTOR SUB-TYPE | ~1303 |
| 3 | FORMAT IDENTIFIER | ~1304 |
| 19 | SUB-FORMAT IDENTIFIER | ~1305 |
| 35 | ⋮ | |

IMAGE DATA TRANSFER SYSTEM, METHOD OF GENERATING IMAGE DATA FILE, AND COMPUTER PROGRAM

BACKGROUND OF THE INVENTION

1. Field of the Invention

The present invention relates to an image data transfer system in which an imaging apparatus and a communication apparatus are connected through a network. Moreover, the present invention relates to an imaging apparatus, a communication apparatus, a method of generating an image data file and a computer program for implementing the same.

2. Description of the Related Art

USB (Universal Serial Bus Protocol is a well-known digital hardware interface suited to transfer video data between devices. For instance, the USB protocol is now widely used in computers and imaging apparatuses as an interface for attaching peripheral devices.

The USB specification (protocol) has a synchronous transfer mode called isochronous to guarantee real time transfer of video data. In the isochronous mode, a host controller transmits a synchronous signal called start of frame (SOF) to each device connected to the host controller. When the device transmits video data on a bus, the device synchronizes with the SOF and enables guaranteeing the real time transmission of video data.

In the isochronous transfer mode, in order to transmit video data, devices are required to obtain a bandwidth used for transmission. Each device notifies a host controller by descriptors of an alternate setting which indicates the bandwidth necessary for the isochronous data transfer and the host controller selects the alternate settings by sending a Set-Interface request to each device, thus, the bandwidth is assigned.

FIG. 11 is a schematic illustration of a structure of a descriptor stored in a device used in the isochronous transfer of video data. A device descriptor 1101 notifies a vendor ID, a product ID or the like. A configuration descriptor 1102 notifies a configuration available in the device. A descriptor 1103 indicates an alternate setting 0 of an interface #1 used in the configuration 1102. An endpoint descriptor 1104 is used in the interface descriptor 1103 where a Max Payload which indicates a bandwidth in the isochronous transfer type is 0. An interface descriptor 1105 indicates an alternate setting 1 of the interface #1. An endpoint descriptor 1106 is used when the interface #1 is selected as the alternate setting 1 where a Max Payload which indicates a bandwidth in the isochronous transfer type is 512. Accordingly, in response to a Set-Interface request shown in FIG. 12, the alternate setting 1 of the interface #1 is selected and the data transfer of 512 bytes per SOF cycle (in the USB full-speed, 1 ms, and in the high-speed, 125 µs) is guaranteed, and the device that stores the descriptor can transfer video data in the isochronous transfer.

The USB specification has no USB-required structure on the data content in the isochronous transfer, so that any kind of data can be transferred. That is, each device needs to communicate with each other on a data format to be used. As to stream data formats used in the isochronous transfer, it is possible to notify a format to be used to a destination host controller by descriptors.

FIG. 13 illustrates an example of a descriptor for notifying a stream format to be transmitted to a host controller. The reference numeral 1301 represents a descriptor length. The reference numerals 1302 and 1303 indicate types of the descriptor, that is, the descriptor that notifies the stream format. Identifiers 1304 and 1305 represent the stream format to be transmitted as the isochronous data. The host controller reads the values of the identifiers, recognizes the stream format to be transmitted from the device which stores the descriptor shown in FIG. 13, and can process the received stream data.

FIG. 14 illustrates a data flow in a case of sending video data on USB. A host controller obtains a descriptor indicating a stream format from a device by a Get-Descriptor (1401), and changes an alternate setting to 1 by a Set-Interface (1402). Then, the host controller transmits In Token packets (1403 to 1405) to the device in response to each SOF. If the device has data to transmit, the device transmits actual isochronous data (1406 to 1408) after receiving the In Token packets.

FIG. 15 illustrates a time-series data flow over USB. A SOF (1501) is transmitted every 1 ms (125 µs in the high-speed), and similarly, an In Token (1502) is transmitted from a host controller to an isochronous endpoint of a device. When the device has data to transmit following the In Token (1502), the device transmits a data packet (1503) via the isochronous endpoint. Although the device can transmit data in response to In Tokens every cycle, if it is not possible to transmit the data at 1504, the device may not transmit the data and may transmit the data at the next cycle (See the Universal Serial Bus Specification Revision 1.1, Sep. 23, 1998 and the Universal Serial Bus Specification Revision 2.0, Apr. 27, 2000).

In order to transfer data in real time by USB interfaces, a bandwidth has to be reserved for a bus that transfers data so that the real time data transfer is guaranteed. Referring to FIG. 16, as described above, in a case of USB interfaces, a bandwidth is guaranteed by a Max Payload that is set to an endpoint 1604. The endpoint has attributes of the isochronous transfer associated with a USB interface 1602 from a device 1601. In the example shown in FIG. 16, when an alternate setting 1603 of the interface 1602 is selected by a Set-Interface standard request, the Max Payload of an endpoint 1605 is set to 512, and data can be transferred up to 512 bytes per SOF to a host controller 1607 via the endpoint 1605. In that case, the data of up to 512 bytes can be transferred from a pipe 1606 of the endpoint 1605. In a case where the interface 1602 is set to the alternate setting 0 instead of the alternate setting 1 (1603) by the Set-Interface standard request, the data transfer is not possible. However, since no bus bandwidth is reserved, bandwidths available for any other devices increase.

One scenario is a case where a personal computer (PC) serving as a host controller is connected to an imaging apparatus by a USB interface and an application for displaying camera images (images being captured) taken by the imaging apparatus is launched, the camera images have to be displayed. Referring to FIG. 17, after the connection between the PC and the imaging apparatus has been established, the PC issues a Get-Descriptor request to the imaging apparatus so as to obtain descriptor information about the imaging apparatus at step S1701.

At step S1702, when the request is received, the imaging apparatus transmits the descriptor information to the PC. Actually, the Get-Descriptor request is issued in accordance with the descriptor types such as a device, and a configuration. After obtaining all of the descriptor information, a Set-Configuration is issued so as to select an arbitrary configuration and make setting. Since conventional devices have one configuration, a default configuration is to be selected at step S1703.

At step S1704, in a case where the target imaging apparatus has an interface for streaming, an Alternate Setting 0 of the Set-Interface is issued and setting is made so as not to transfer the streaming. When a PC application 1700 is activated that displays the camera images captured by the imaging apparatus, an Alternate Setting 1 of the Set-interface is issued by the PC application to the imaging apparatus to display the streaming. Then the PC application requests transmission of streaming to the imaging apparatus at step S1705.

Upon receiving the request, the imaging apparatus transmits an Ack at step S1706 and at step S1707, real time streaming data is transferred in accordance with the streaming format set by the Alternate setting 1. The transferred streaming data is stored as a file by the PC application.

Conventional high-performance video cameras, are equipped with a function of arbitrarily changing parameters for image setting such as gamma, hue, and skin detail and store the changed parameters.

Although the parameters for image setting can be changed according to scenes, such parameters are not stored in the conventional video cameras. Further, conventional video cameras cannot store the data which associate video data files generated during image capturing with image setting parameters synchronized with video data, that is, image setting parameters generated during image capturing.

SUMMARY OF THE INVENTION

One aspect of present invention is that it overcomes the aforementioned drawbacks.

According to one exemplary embodiment of the present invention, an image data transfer system in which an imaging apparatus and a communication apparatus are connected through a network, can associate an image setting parameter of each scene with each image data file and store the associated parameter and file.

One aspect of the present invention is to provide an image data transfer system in which an imaging apparatus and a communication apparatus are connected through a network. The imaging apparatus has a transferring unit configured to transfer image data obtained during image capturing to the communication apparatus, a storing unit configured to store image setting information which can be arbitrarily changed, and a transmitting unit configured to transmit image setting information of the image data used during image capturing to the communication apparatus. The communication apparatus has a recording unit configured to record the image data transferred from the imaging apparatus and generating a file of the recorded image data, and an associating unit configured to associate the image setting information transmitted from the imaging apparatus with the file of the image data and storing the associated information and file.

Another aspect of the present invention is to provide an imaging apparatus configured to be connected to a communication apparatus through a network. The imaging apparatus has a transferring unit configured to transfer image data obtained during image capturing to the communication apparatus, a storing unit configured to store image setting information which can be arbitrarily changed, and a transmitting unit configured to transmit image setting information of the image data used during image capturing to the communication apparatus.

Still another aspect of the present invention is to provide a communication apparatus configured to be connected to an imaging apparatus through a network and the imaging apparatus includes a transferring unit configured to transfer image data obtained during image capturing and a storing unit configured to store image setting information which can be arbitrarily changed and a transmitting unit configured to transmit image setting information of the image data used during image capturing. The communication apparatus includes a starting unit configured to start recording of the image data transferred from the imaging apparatus in response to a recording start request, a generating unit configured to generate a file of the image data, for which recording is started in response to the recording start request, in response to a file generation request, and an associating unit configured to associate the image setting information transmitted from the imaging apparatus with the file of the image data and storing the associated information and file.

Still another aspect of the present invention is to provide a method of generating a file of image data by using an image data transfer system in which an imaging apparatus and a communication apparatus are connected through a network. According to the method, the imaging apparatus performs a step of transferring image data obtained during image capturing to the communication apparatus, a step of transmitting image setting information of the image data used during image capturing to the communication apparatus, and the communication apparatus performs a step of recording the image data transferred from the imaging apparatus and generating a file of the recorded image data, and a step of associating the image setting information transmitted from the imaging apparatus with the file of the image data and storing the associated data.

Still another aspect of the present invention is to provide a computer program used for controlling an imaging apparatus connectable with a communication apparatus through a network. The program directs a computer to perform a step of transferring image data obtained during image capturing to the communication apparatus, a step of storing image setting information which can be arbitrarily changed, and a step of transmitting image setting information used during image capturing of the image data to the communication apparatus.

Another aspect of the present invention is to provide a computer program used for controlling an communicating apparatus connectable with an imaging apparatus through a network. The imaging apparatus has a transferring unit configured to transfer image data obtained during image capturing, a storing unit configured to store image setting information which can be arbitrarily changed, and a transmitting unit configured to transmit image setting information used during image capturing of the image data to the communication apparatus. The program directs a computer to perform a step of starting recording of image data transferred from the imaging apparatus in accordance with a recording start request, a step of generating a image data file of the image data for which the recording is started by the recording start request in accordance with a file generation request and a step of associating the image setting information transmitted from the imaging apparatus with the image data file and storing the associated information and file.

According to an exemplary embodiment of the present invention, in an image data transfer system in which an imaging apparatus and a communication apparatus are connected through a network, when a file of image data is generated in the communication apparatus, image setting parameters of each scene can be associated with each file of the image data and stored.

Further embodiments, aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIG. 5 illustrates an example of a custom preset file with association data added thereto.

FIG. 7 illustrates an exemplary structure of a management file for managing association established between a video data file and a custom preset file.

FIG. 12 illustrates a structure of a Set-Interface request specified in the USB specification.

FIG. 13 illustrates an example of a descriptor stored in a USB device.

DETAILED DESCRIPTION OF THE EMBODIMENTS

Various embodiments, features and aspects of the present invention will now be herein described in detail below with reference to the drawings.

First Exemplary Embodiment

Figure 1:
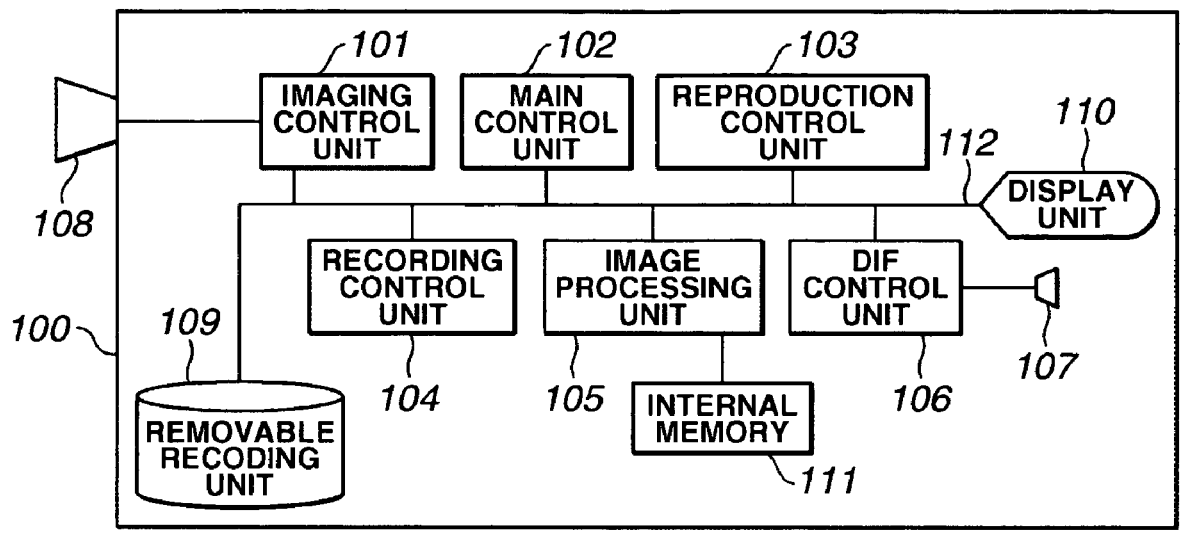
FIG. 1 is a schematic illustration of an exemplary structure of a digital video camera as an imaging apparatus to which the present invention is applied.

FIG. 1 is a schematic illustration of an exemplary structure of a digital video camera 100 (hereinafter referred to as DVC) serving as an imaging apparatus to which the present invention is applied. When a recording is made, an imaging control unit 101 captures video or a still image of an object by controlling an image capturing unit 108. The video or still image captured by the image capturing unit 108 is compressed in accordance with an appropriate format by an image processing unit 105, and the compressed data is transferred to a removable recording unit 109 (cassette tape, memory card or the like) by a recording control unit 104 so as to be recorded there.

Meanwhile, when an image is reproduced, the video or still image data recorded on the removable recording unit 109 is read out by a reproduction control unit 103, decompressed in accordance with an appropriate format by the image processing unit 105, and the image information indicated by the decompressed data is transferred to a display unit 110 and displayed. An internal memory 111 is also provided.

If an external device is connected to a digital interface 107, the video or still image data compressed by the image processing unit 105 is output through the digital interface 107 under the control of a DIF control unit 106. In the present embodiment, the digital interface 107 is a USB interface, however, it may be a digital interface in compliant with the IEEE1394 standard or other protocols with similar functional capabilities.

Each unit is connected through a data/address bus 112 and a data transfer is performed through the bus 112. A main control unit 102 controls each control unit.

Figure 2:
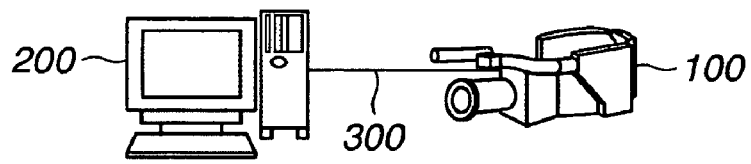
FIG. 2 illustrates an exemplary image data transfer system in which a digital video camera and a host personal computer are connected through a USB interface.

Referring to FIG. 2, an image data transfer system is configured such that the DVC 100 shown in FIG. 1 and a host PC (personal computer) 200 are connected through a USB interface 300. A terminal of the USB interface 300 on the DVC 100 side is connected to the digital interface 107. According to the procedure described in the Background Section of the specification, the host PC 200 can obtain real time video data being captured by the DVC 100 through the USB interface 300.

The DVC 100, in accordance with the present embodiment, has an interface for streaming transmission, and further, the interface has an alternate setting 0 and an alternate setting 1. The alternate setting 0 indicates that a bandwidth is zero and streaming data cannot be transferred. The alternate setting 1 indicates that a bandwidth is reserved and streaming data can be transferred. The streaming data is described in device setting information called a descriptor. These alternate settings can be switched if the host PC 200 issues a Set-Interface which is a standard instruction in the USB specification.

The DVC 100 is connected to the host PC 200 though the USB interface 300 according to the present embodiment. When a recording button of the DVC 100 is depressed, the DVC 100 starts to record captured video image on a tape medium which is inserted as the recording unit 109. At the same time, the DVC 100 performs a function of issuing a recording request to the host PC 200 (in the present invention, called recording start request). Further, the DVC 100 connected to the host PC 200 though the USB interface 300 stops recording of captured video image on the tape medium which is inserted as the recording unit 109 when a recording stop button (or recording pause button) of the DVC 100 is depressed. At the same time, the DVC 100 performs a function (in the present invention, referred to as a DV controller function) of issuing a recording stop request to the host PC 200 (in the present invention, referred to as file generation request).

The host PC 200 receives the recording request from the DVC 100, and starts the recording of the streaming data transferred from the DVC 100 on a recording medium (an internal buffer memory, a hard disk or the like) in the host PC 200. When the host PC receives the recording stop request, the host PC 200 stops the recording of the streaming data which was started in response to the recording request, and stores the data as a file (or stores as a part of a file). This function is referred to as a "DV Record Application" in the present invention.

Figure 3:
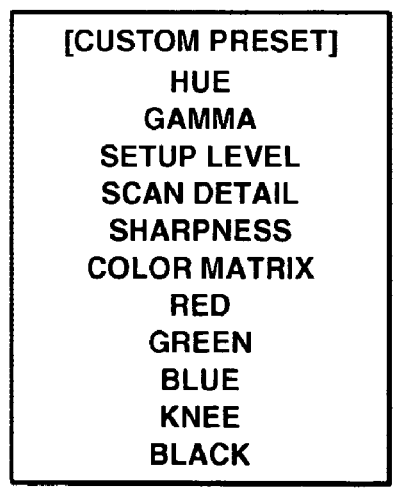
FIG. 3 illustrates an example of image setting parameters of a custom preset.

Further, as one of its function, the DVC 100 according to the present embodiment arbitrarily changes image setting parameters such as hue, and gamma and stores the changed image setting parameters. For example, as shown in FIG. 3, a plurality of image setting parameters of a camera such as hue, gamma, setup level, skin detail, sharpness, color matrix, knee, and set up level of optical black are stored as a file (custom preset file) in an internal memory 111. By setting or changing the custom preset file, a plurality of the image setting parameters described in the custom preset file that are thus set or changed become effective. Further, the file data in the custom preset file can be transmitted to the host PC 200 through the USB interface 300.

Figure 4:
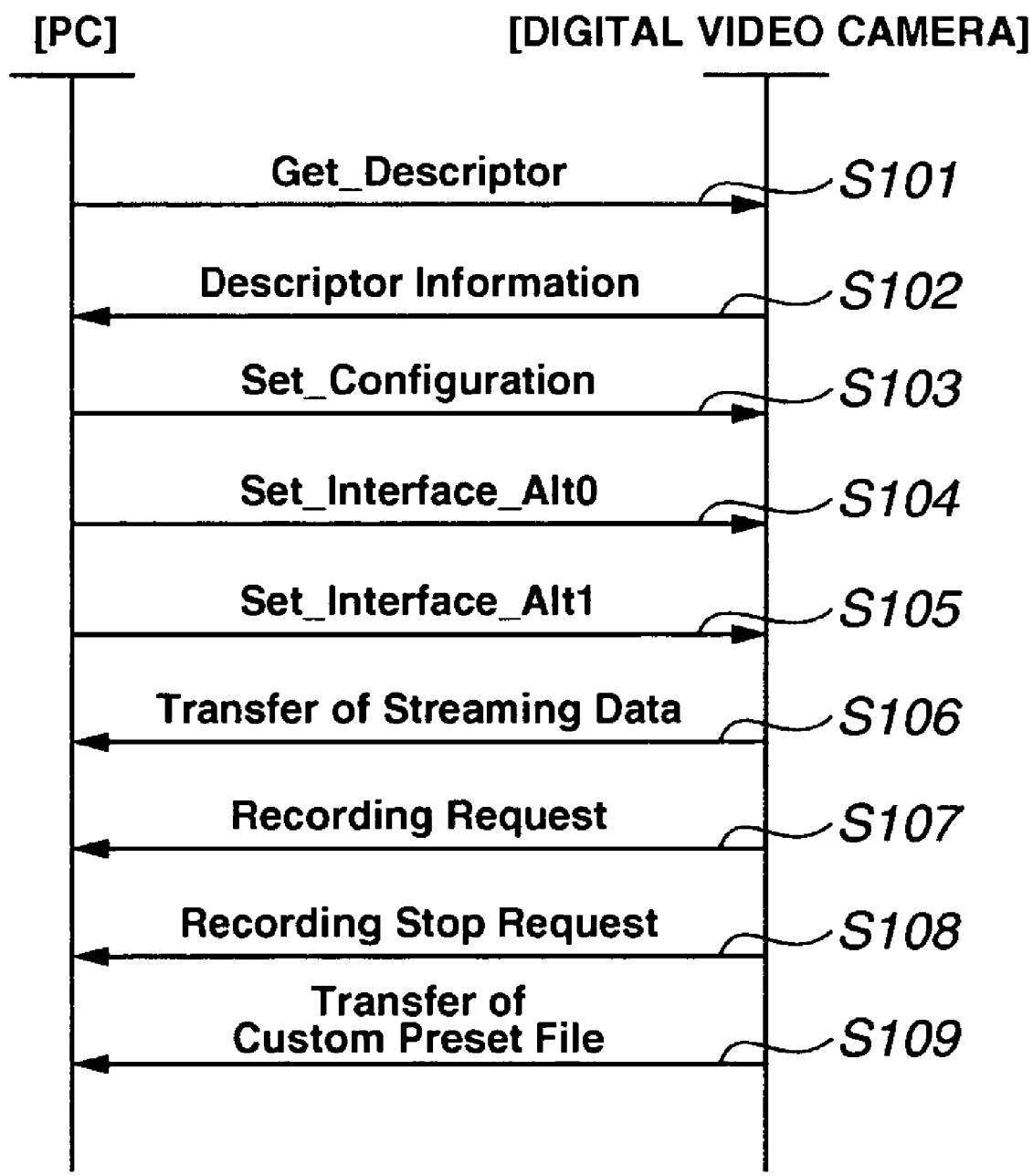
FIG. 4 is a sequence view for illustrating exemplary processing in the image data transfer system in accordance with a first embodiment.

Exemplary processing in the image data transfer system according to the present embodiment will now be described in reference to FIG. 4. At step S101, the host PC 200 and the DVC 100 are connected through the USB interface 300. When the connection of the device is recognized, the host PC 200 issues a Get-Descriptor request so as to obtain detailed information about the connected device.

At step S102 the DVC 100 receives the Get-Descriptor request and transmits the descriptor information. These descriptor obtaining steps of S101 and S102 are continued until all descriptors have been obtained.

At step S103, after the host PC 200 obtained the all descriptor information, the host PC 200 issues a Set-Configuration request and initiates setting of the configuration.

Then at step S104, if it is determined from the obtained descriptors that the DVC 100 has an interface which is a logical block to send streaming data, a request of Set-Interface Alternate Setting 0 is issued. The request of Set-Interface Alternate Setting 0 is an instruction to set an alternate setting 0 which does not allow to send streaming data of video.

After the above negotiation has been completed, at step S105 a Set-Interface Alternate Setting 1 for changing the setting to transferring the streaming data is issued. At step S106, when the DVC 100 receives the Set-Interface Alternate Setting 1, the transfer of the streaming data of captured video image is started and the streaming data is transferred to the USB interface 300 in the isochronous (synchronous) transfer.

After the host PC 200 received the streaming data, the host PC 200 only displays the streaming data being transferred. The host PC 200 does not record the data on a recording medium such as a hard disk until a recording request is received from the DVC 100.

At step S107, when a recording button of the DVC 100 is depressed, a recording request is issued and the recording of the captured video image on a tape medium starts in a case where the tape medium is inserted as the removable recording unit 109. The host PC 200 receives the recording request, and the recording of the streaming data transferred from the DVC 100 is started on a recording medium such as a hard disk in the host PC 200.

Then at step S108, when a recording stop button (or recording pause button) of the DVC 100 is depressed, a recording stop request is issued and the recording on the tape medium is stopped. At the host PC 200 side which received the recording stop request, the recording of the streaming data on the recording medium is stopped and a file of the recorded video data is generated.

At step S109 after the DVC 100 issued the recording stop request, a custom preset file is transmitted in the bulk transfer. The custom file is synchronized with the video data captured between the operation of the recording button and the operation of the recording stop button. When the custom preset file is transmitted to the host PC 200, the DVC 100 adds to the custom preset file association data such as a file ID 501, a date and time 502, a time code 503, an ATN (Absolute Track Number) 504 which is address information in a tape medium as shown in FIG. 5.

In reference to FIG. 6, steps that follow will be described. At step S201, the host PC 200 receives the custom preset file. In a case where the association data is added to the streaming data, at step S202, a video data file is generated with the association data attached to the streaming data or a management file is newly created to associate the video data file with the custom preset file. As an example of the management file, a table which has a name of a custom preset file, a name of video file, and a date and time is created for each ID at step S203 as shown in FIG. 7. Here, the custom preset file and the video file are only required to be associated with each other. Accordingly, a custom preset file may be embedded in a header portion or an index portion of a video file. Thus, the management file becomes unnecessary and the custom preset file can be identified by just checking the header or index portion of the video file.

On the other hand, in a case where the communication apparatus file has no association data, that is, in a case where association data is not added to the custom preset file at the DVC 100 side at step S202, the association data is generated at the host PC 200 side and is added to the custom preset file and to the video data file respectively, or a management file is newly created to associate the video data file with the custom preset file. For example, as shown in FIG. 7, a table which has a name of a custom preset file and a date and time for each ID is created as the management file at step S204.

As described above, the data of video captured by the DVC 100 can be transferred as streaming data while an image is being capture by the DVC 100. The image is captured by the DVC 100 using the established image setting parameters. When the recording button of the DVC 100 is depressed, the recording request is issued to the host PC 200 and the streaming data on the recording medium can be recorded. Further, when the recording stop button (or recording pause button) is depressed, the video data file is generated in the host PC 200. At the same time, recording the image setting parameters synchronized with the video data is possible. That is, the file of the image setting parameters used during the video data capturing is transmitted to the host PC 200. Respective files of the video image setting parameters and the video data can be associated, and stored and managed as the associated data.

Second Exemplary Embodiment

A second embodiment shows an example in which the DVC 100 can be operated by issuing a recording request and a recording stop request to the DVC 100 from the host PC 200 side. The structures of the DVC 100 and the image data transfer system are the similar to those shown in FIG. 1 and FIG. 2. Accordingly, a detailed explanation is not provided.

Figure 8:
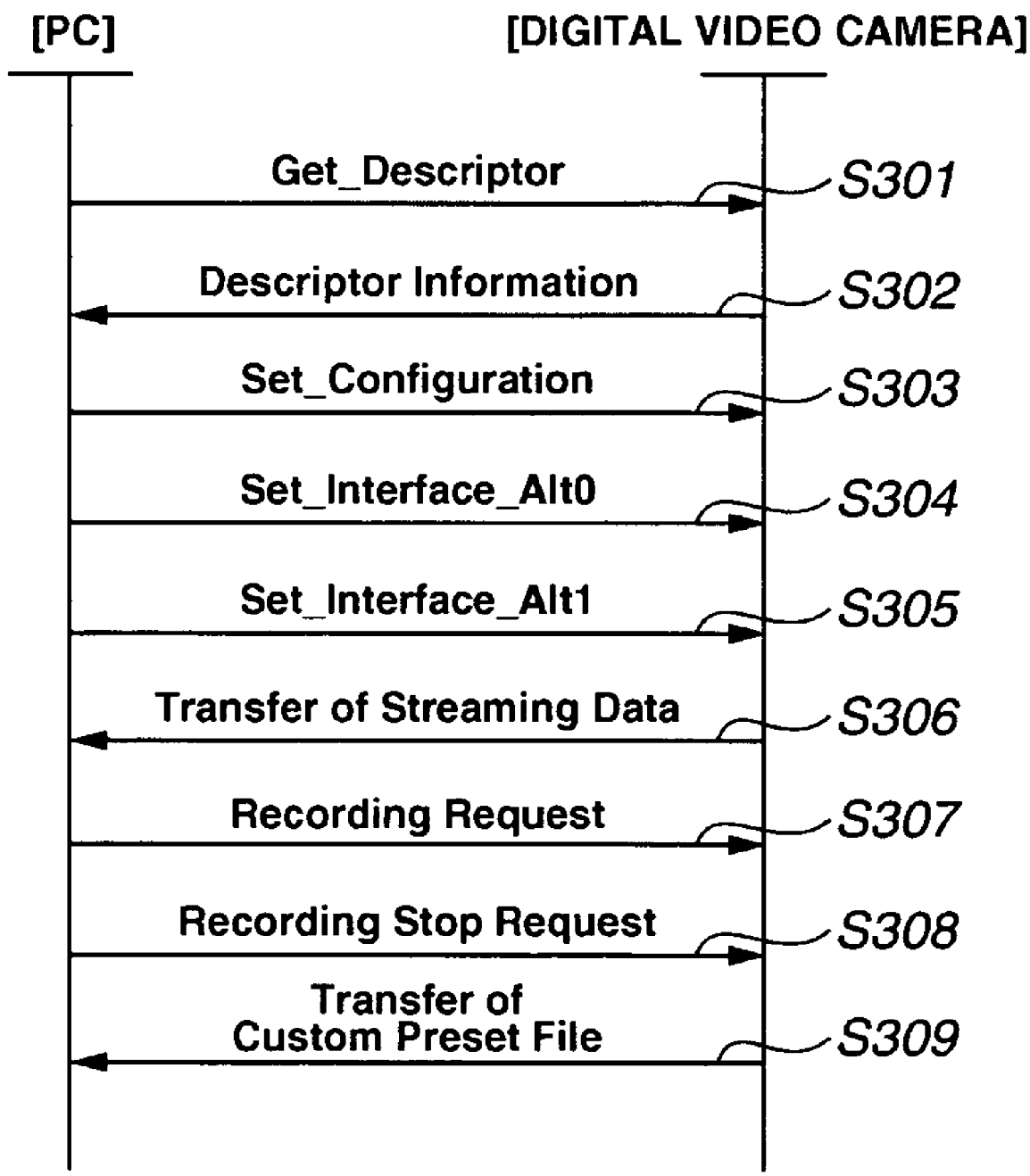
FIG. 8 is a sequence view for illustrating an exemplary processing operation in the image data transfer system in accordance with a second embodiment.

An exemplary processing in the image data transfer system according to the second embodiment will be described in reference to FIG. 8. At step S301, the host PC 200 and the DVC 100 are connected through the USB interface 300. When the connection of the device is recognized, the host PC 200 issues a Get-Descriptor request so as to obtain detailed information of the connected device.

At step S302, the DVC 100 receives the Get-Descriptor request and transmits the descriptor information. These descriptor obtaining steps of S301 and S302 are continued until all descriptors are obtained.

At step S303, after the host PC 200 has obtained the all descriptor information, the host PC 200 issues a Set-Configuration request and makes setting of the configuration.

Then at step S304, if it is determined from the obtained descriptors that the DVC 100 has an interface which is a logical block to send streaming data, a request of Set-Interface Alternate Setting 0 is issued. The request of Set-Interface Alternate Setting 0 is an instruction to make an alternate setting 0 which does not allow to send streaming data of video. When the DVC 100 receives a request of Set-Interface Alternate Setting 0, the interface is set to the alternate setting 0.

After the above negotiation has been completed, at step S305, a request for a Set-Interface Alternate Setting 1 is issued. The Set-Interface Alternate Setting 1 changes the setting to transfer of the streaming data. At step S306, the DVC 100 receives the Set-Interface Alternate Setting 1, and starts to transfer the streaming data of captured video image to the USB interface 300 in the isochronous (synchronous) transfer.

When the streaming data is received, the host PC 200 only displays the streaming data being transferred and does not record the data on a recording medium such as a hard disk until the host PC 200 issues a recording request.

At step S307, when a recording button of the host PC 200 is depressed, the host PC 200 issues a recording request and starts to record the streaming data transferred from the DVC 100 on a recording medium such as a hard disk in the host PC 200. The DVC 100 side which received the recording request, starts to record the video data being captured on a tape medium, if the tape medium is inserted as the removable recording unit 109.

Then at step S308, when a recording stop button (or recording pause button) is depressed at the host PC 200 side, the host PC 200 issues a recording stop request and stops the recording of the streaming data on the recording medium to generate a file of the recorded video data. The DVC 100 side which received the recording stop request stops the recording on the tape medium.

At step S309, after the DVC 100 issues the recording stop request, a custom preset file synchronized with the video data captured between the operations of the recording button and the recording stop button is transmitted in the bulk transfer. When the custom preset file is transmitted to the host PC 200, the DVC 100 adds association data such as a file ID 501, a date and time 502, a time code 503, and an ATN (Absolute Track Number) 504 to the custom preset file as shown in FIG. 5.

Figure 6:
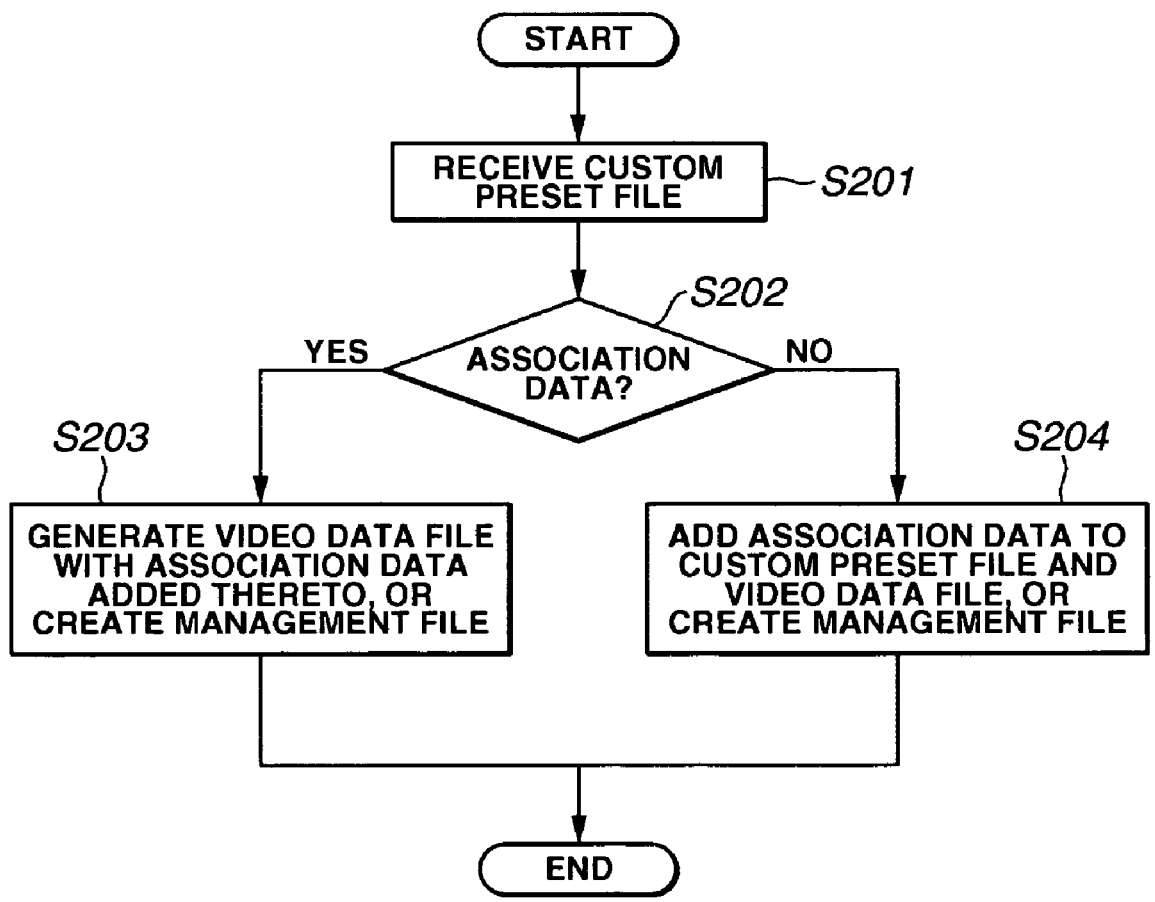
FIG. 6 is a flow chart for illustrating exemplary processing in the image data transfer system in accordance with the first embodiment.

Finally, a similar procedure as described in the first embodiment with respect to FIG. 6, is then applied to the second exemplary embodiment.

Third Exemplary Embodiment

A third exemplary embodiment is an example in which the host PC 200 can issue a request to change image setting parameters of a custom preset file to the DVC 100. The structure of the DVC 100 and the image data transfer system are similar as those shown in FIG. 1 and FIG. 2, and therefore, are not discussed again. In the third embodiment, as in the second embodiment, the host PC 200 can issue a recording request and a recording stop request to the DVC 100 and operate the DVC 100.

Figure 9:
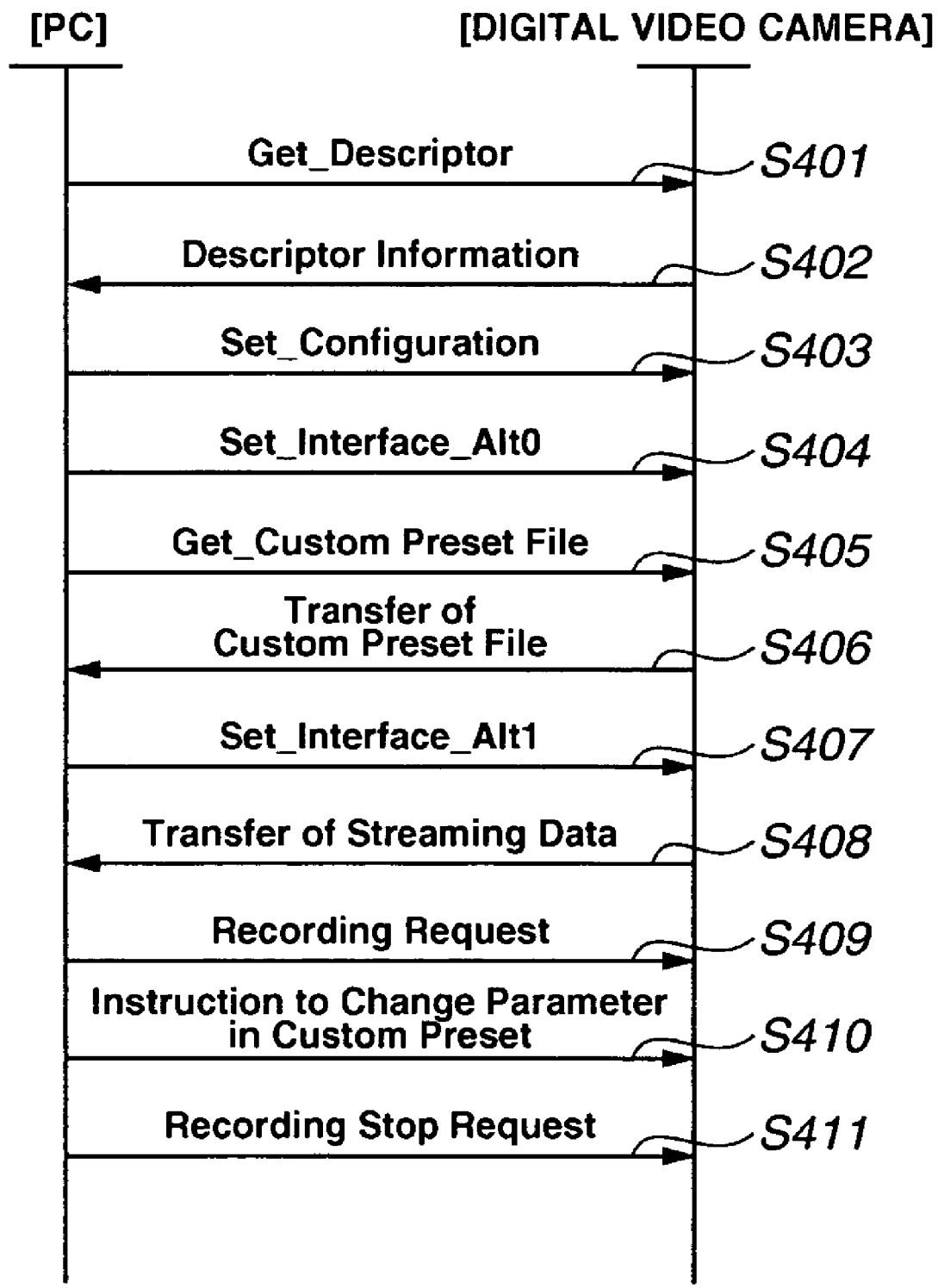
FIG. 9 is a sequence view for illustrating an exemplary processing operation in the image data transfer system in accordance with a third embodiment of the present invention.

The processing in the image data transfer system according to the third embodiment will be described in reference to FIG. 9. At step S401, the host PC 200 and the DVC 100 are connected through the USB interface 300. After the connection of the device is recognized, the host PC 200 issues a Get-Descriptor request so as to obtain detailed information of the connected device.

At step S402, the DVC 100 receives the Get-Descriptor request and transmits the descriptor information. These descriptor obtaining steps of S401 and S402 are continued until all descriptors are obtained.

At step S403, after all descriptor information is obtained, the host PC 200 issues a Set-Configuration request and make setting of the configuration.

Then at step S404, if it is determined from the obtained descriptors that the DVC 100 has an interface which is a logical block to send streaming data, a request of Set-Interface Alternate Setting 0 is issued. The request of Set-Interface Alternate Setting 0 is an instruction to make an alternate setting 0 which does not allow to send streaming data of video. When the DVC 100 receives the request of Set-Interface Alternate Setting 0, the interface is set to the alternate setting 0.

After the above negotiation has been completed, at step S405, the host PC 200 issues a command to obtain a custom preset file to the DVC 100. At step S406, the information on the custom preset file that was already set is transferred from the DVC 100, thus the host PC 200 can obtain the information.

At step S407, a request for a Set-Interface Alternate Setting 1 is issued which changes the setting to transfer of the streaming data. At step S408, the DVC 100 receives the request for the Set-Interface Alternate Setting 1, and starts to transfer the streaming data of captured video image to the USB interface 300 in the isochronous transfer.

After the streaming data is received, the host PC 200 only displays the streaming data being transferred and does not record the data on a recording medium such as a hard disk until the host PC 200 issues a recording request.

At step S409, when a recording button is depressed, the host PC 200 issues a recording request and starts to record the streaming data transferred from the DVC 100 on a recording medium such as a hard disk in the host PC 200. The DVC 100 side which received the recording request, starts to record the video data being captured on a tape medium if the tape medium is inserted as the removable recording unit 109.

When a request to change parameters of the custom preset is issued from the host PC 200, the DVC 100 changes image setting parameters in response to each request and the host PC 200 updates the image setting parameters of the custom preset to the current settings at step S410.

Then at step S411, when a recording stop button (or recording pause button) is depressed, the host PC 200 side issues a recording stop request and stops the recording of the streaming data on the recording medium to generate a file of the recorded video data. The DVC 100 side which received the recording stop request stops the recording on the tape medium.

Figure 10:
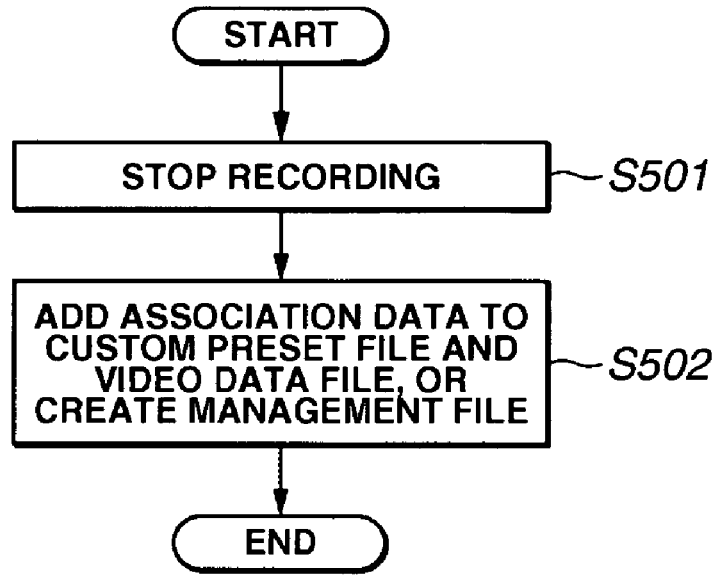
FIG. 10 is a flow chart for illustrating exemplary processing in the image data transfer system in accordance with the third embodiment.
Figure 11:
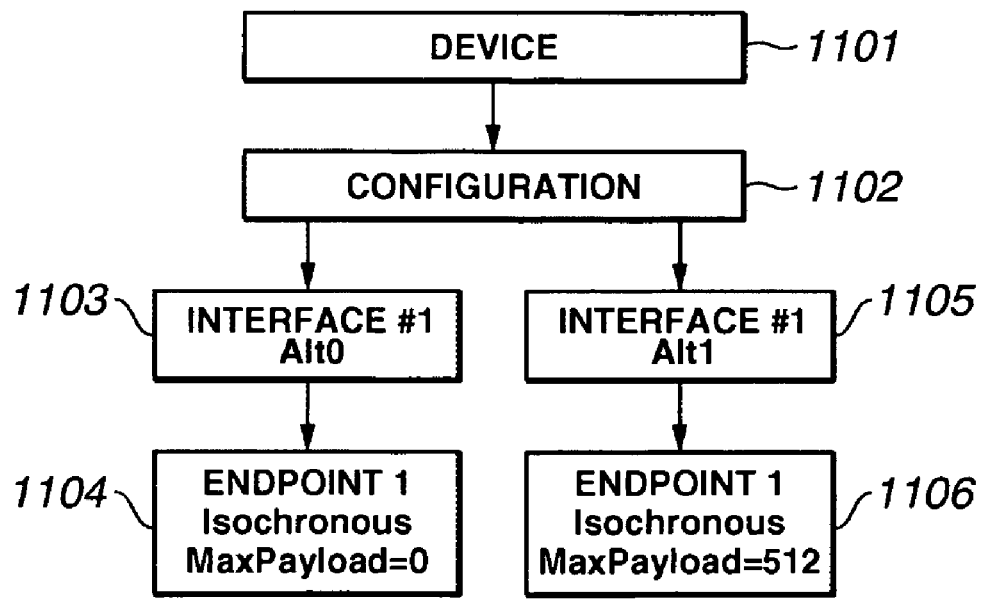
FIG. 11 is a schematic illustration of a structure of a descriptor specified in the USB specification.
Figure 14:
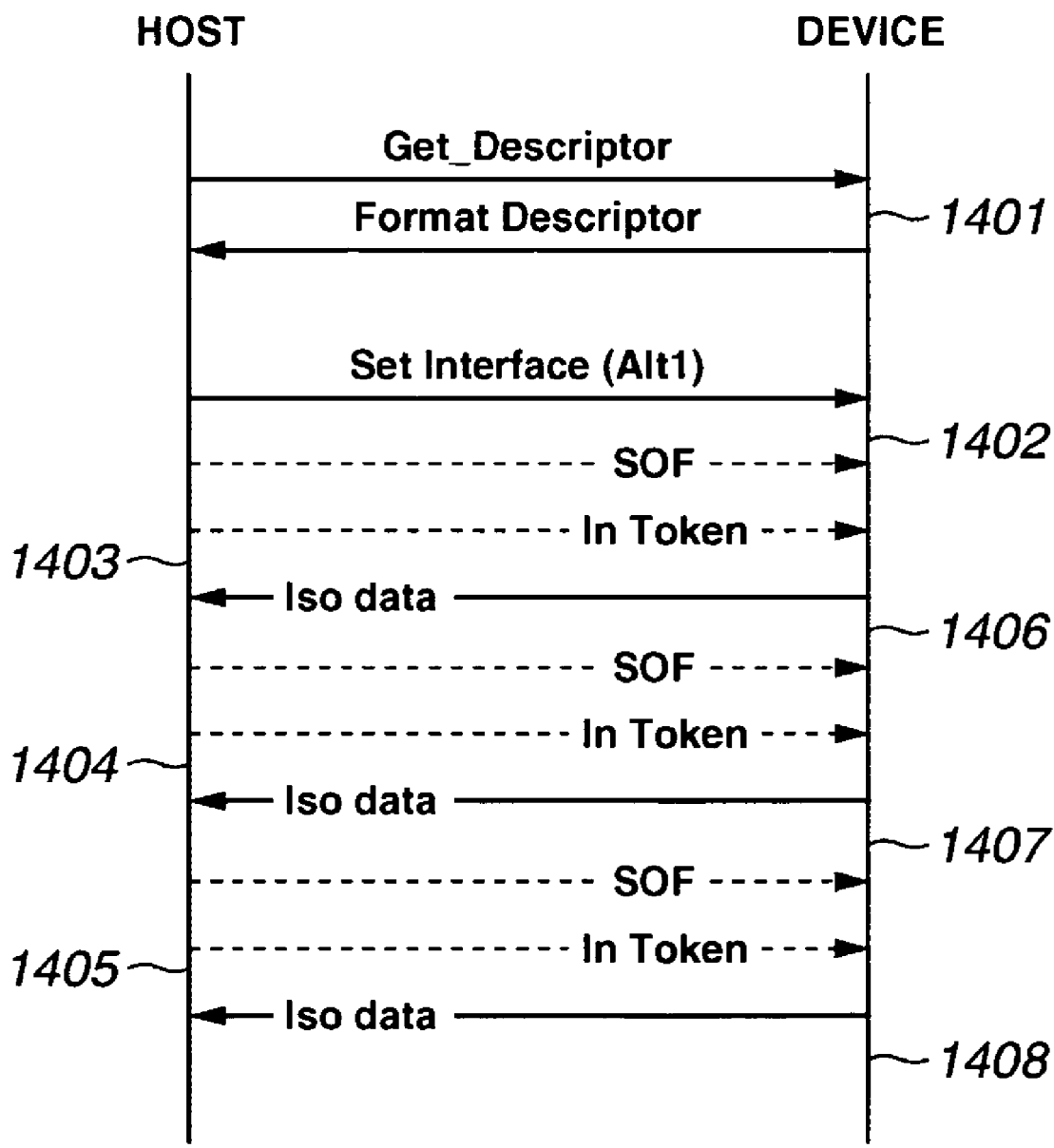
FIG. 14 is an illustration simply showing a data flow of sending video data on USB.
Figure 15:
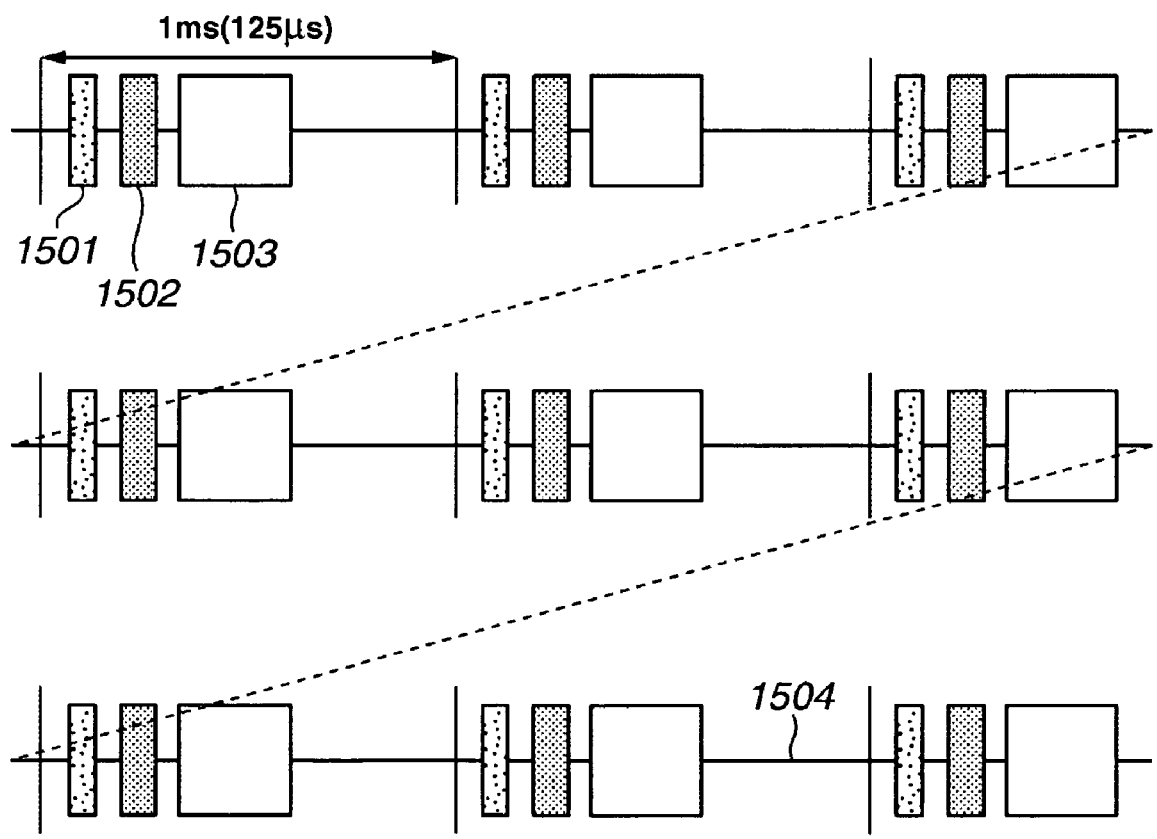
FIG. 15 illustrates a time-series data flow over USB.
Figure 16:
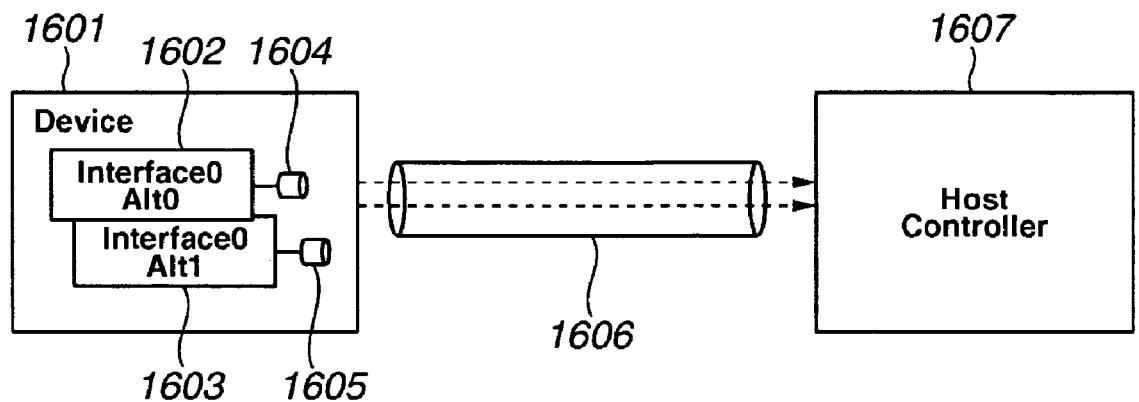
FIG. 16 illustrates an interface between a host controller and a device over USB.
Figure 17:
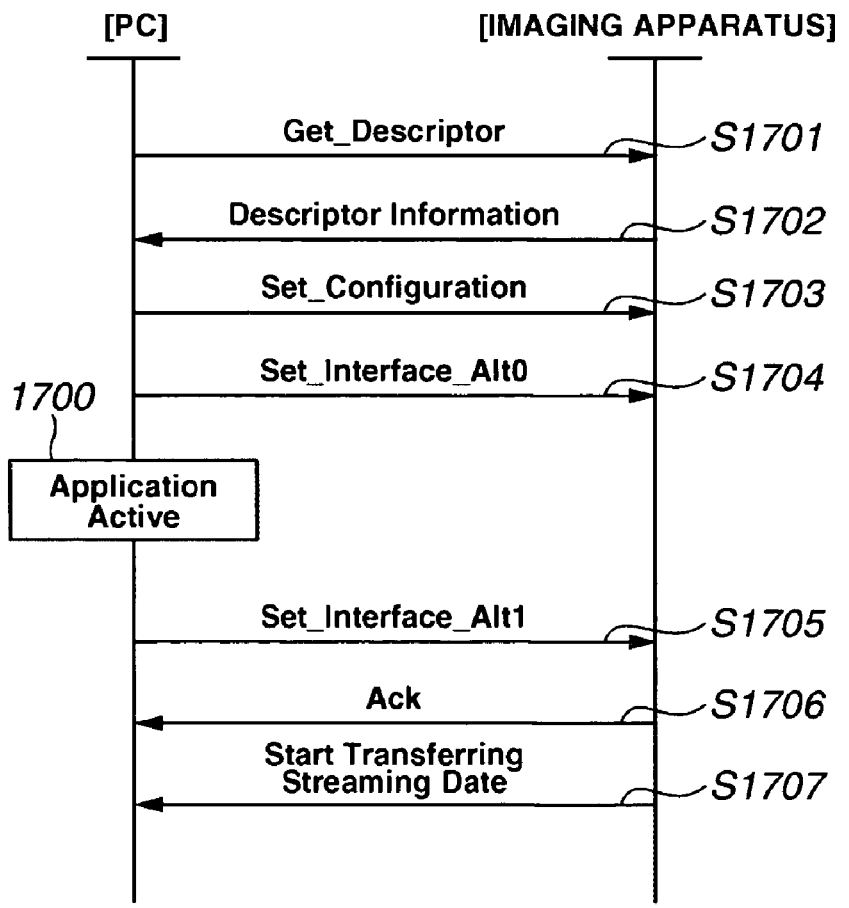
FIG. 17 is a sequence view for illustrating processing in an image data transfer system.

In reference to FIG. 10, steps that follow will be described. At step S501, the host PC 200 finishes the recording and generates a file of the video data. At the same time, the host PC 200 generates a custom preset file from the current image setting parameters at step S502. Then, association data is generated at the host PC 200 side and added to the custom preset file and to the video data file respectively, or a management file is newly created to associate the video data file with the custom preset file. As an example of the management file, a table which has a name of a custom preset file and a name of a video file, a date and time is created for each ID as shown in FIG. 7.

Other Exemplary Embodiments

Features and Aspects of the Present Invention

The present invention can also be achieved by providing a storage medium storing program code for performing the aforesaid processes to an image sensing system or apparatus, reading the program codes by a CPU or a MPU of the image sensing system or apparatus from the storage medium, and executing the program.

In this case, the program codes read from the storage medium realize the functions according to the embodiments, and the storage medium storing the program codes constitutes the invention.

Further, as a storage medium for providing the program codes, mediums such as floppy disks, hard disks, optical disks, magneto-optical disks, CD-ROMs, CD-Rs, magnetic tapes, non-volatile type memory cards, and ROMs, and computer networks, such as LANS (local area network) or WANs (wide area network) can be used.

Furthermore, while aforesaid functions according to the above embodiments are realized by executing the program codes which are read by a CPU of the image sensing system or apparatus, the present invention includes a case where an OS (operating system) or the like working on the computer performs a part or entire processes in accordance with designations of the program codes and realizes the functions according to the above embodiments.

Furthermore, the present invention also includes a case where, after the program codes read from the storage medium are written in a function expansion card which is inserted into the image sensing system or apparatus or in a memory provided in a function expansion unit which is connected to the image sensing system or apparatus, a CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart described in the embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-023249 filed Jan. 31, 2005, which is hereby incorporated by reference herein in its entirety.

What is claimed is:

1. An imaging apparatus, comprising:
an image capture unit that generates captured image data;
a storage unit that stores image setting information corresponding to the captured image data, the image setting information includes information relating to at least one of hue, gamma, skin detail, sharpness, color matrix and knee; and
a transmitting unit that (a) transmits compressed image data generated from the captured image data to an external device, and (b) transmits the image setting information and association data to the external device separately from the compressed image data if the external device stops recording the compressed image data on a recording medium, the association data being used by the external device to make a relation between the image setting information and the compressed image data.

2. The imaging apparatus according to claim 1, further comprising:
a recording button; and
a stop button,
wherein the transmitting unit transmits a recording request to the external device so that the external device can start recording the compressed image data on the recording medium, if the recording button is operated, and
wherein the transmitting unit transmits a stop request to the external device so that the external device can stop recording the compressed image data on the recording medium, if the stop button is operated after the recording button is operated.

3. The imaging apparatus according to claim 2, further comprising:
a recording control unit that (a) starts recording the compressed image data on a removable recording medium, if the recording button is operated, and (b) stops recording the compressed image data on the removable recording medium, if the stop button is operated after the recording button is operated.

4. The imaging apparatus according to claim 1, further comprising:
a recording control unit that (a) starts recording the compressed image data on a removable recording medium, if the imaging apparatus receives a recording request from the external device, and (b) stops recording the compressed image data on the removable recording medium, if the imaging apparatus receives a stop request from the external device,
wherein the recording request is transmitted from the external device to the imaging apparatus if the external device starts recording the compressed image data on the recording medium, and
wherein the stop request is transmitted from the external device to the imaging apparatus if the external device stops recording the compressed image data on the recording medium.

5. The imaging apparatus according to claim 1,
wherein the transmitting unit uses a first transfer mode in order to transmit the compressed image data to the external device, and
wherein the transmitting unit uses a second transfer mode different from the first transfer mode in order to transmit the image setting information and the association data to the external device separately from the compressed image data.

6. The imaging apparatus according to claim 1, wherein the imaging apparatus includes a video camera.

7. A method of controlling an imaging apparatus, comprising:
generating captured image data;
storing image setting information corresponding to the captured image data in a storage unit, the image setting information includes information relating to at least one of hue, gamma, skin detail, sharpness, color matrix and knee;
transmitting compressed image data generated from the captured image data to an external device; and
transmitting the image setting information and association data to the external device separately from the compressed image data if the external device stops recording the compressed image data on a recording medium, the association data being used by the external device to make a relation between the image setting information and the compressed image data.

8. The method according to claim 7, further comprising:
transmitting a recording request to the external device so that the external device can start recording the compressed image data on the recording medium, if a recording button included in the imaging apparatus is operated; and transmitting a stop request to the external device so that the external device can stop recording the compressed image data on the recording medium, if a stop button included in the imaging apparatus is operated after the recording button is operated.

9. The method according to claim 8, wherein a recording of the compressed image data on a removable recording medium is started, if the recording button is operated, and wherein the recording of the compressed image data on the removable recording medium is stopped, if the stop button is operated after the recording button is operated.

10. The method according to claim 7, wherein a recording of the compressed image data on a removable recording medium is started, if the imaging apparatus receives a recording request from the external device, and wherein the recording of the compressed image data on the removable recording medium is stopped, if the imaging apparatus receives a stop request from the external device, wherein the recording request is transmitted from the external device to the imaging apparatus if the external device starts recording the compressed image data on the recording medium, and wherein the stop request is transmitted from the external device to the imaging apparatus if the external device stops recording the compressed image data on the recording medium.

11. The method according to claim 7, wherein a first transfer mode is used by the imaging apparatus in order to transmit the compressed image data to the external device, and wherein a second transfer mode different from the first transfer mode is used by the imaging apparatus in order to transmit the image setting information and the association data to the external device separately from the compressed image data.

12. The method according to claim 7, wherein the imaging apparatus includes a video camera.

* * * * *